UNITED STATES PATENT OFFICE.

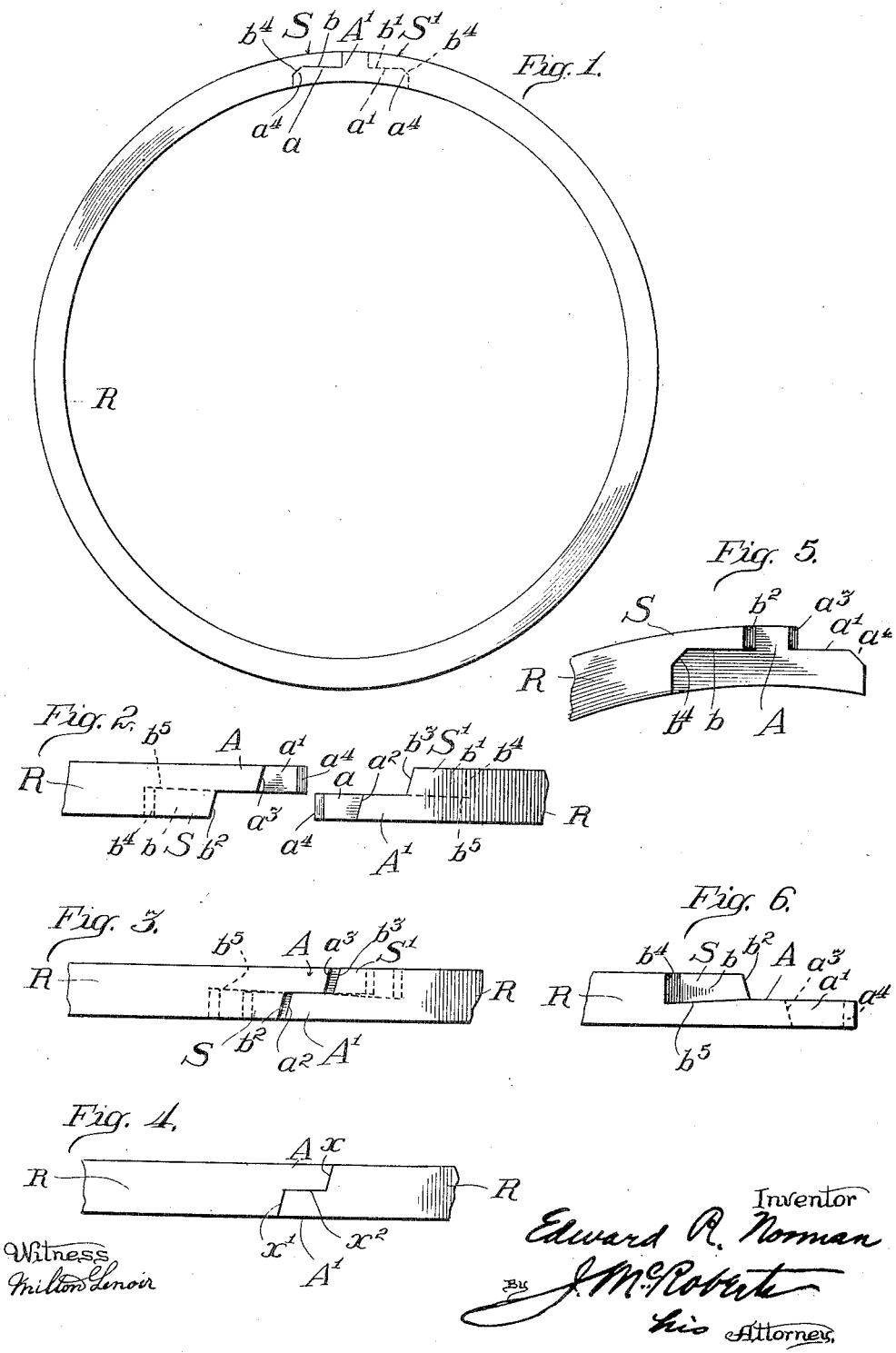

EDWARD R. NORMAN, OF CHICAGO, ILLINOIS.

PACKING-RING.

1,345,804.     Specification of Letters Patent.     Patented July 6, 1920.

Application filed November 28, 1917. Serial No. 204,311.

*To all whom it may concern:*

Be it known that I, EDWARD R. NORMAN, a citizen of the United States, residing at Chicago, in the county of Cook and State of Illinois, have invented certain new and useful Improvements in Packing-Rings, of which the following is a specification, reference being had therein to the accompanying drawings, (Case No. 4.)

My invention relates to piston rings, and consists of the matters herein described and pointed out in the appended claims.

In the drawings in which similar reference letters indicate the same or corresponding parts, Figure 1 is a side view of a ring constructed according to my invention;

Fig. 2 is a detail plan of the joint with the ends open;

Fig. 3 is a similar view with the ring partly closed;

Fig. 4 is a similar view with the ring entirely closed;

Fig. 5 is a detail side view of the parts of the joint on one end of the ring on an enlarged scale, and Fig. 6 is a detail plan view of the parts of the joint on the inner face of the ring on an enlarged scale.

The ring R is made from a blank preferably cut from a pot-casting of suitable metal, and is split to form a step-joint whose opposite pairs of abutting end surfaces are diagonally inclined in the same direction at obtuse angles to the circumferential or longitudinal dividing line of the joint of the ring and are provided with radially disposed co-acting tongues and shoulders extending in the longitudinal line of the ring to make an adjustable seal or joint. The ends of the ring are formed with overlapping tongues A, A'. The recesses are symmetrically cut through the ring on opposite sides to the final line of division of the ring, and the ends of the ring are undercut on the inner surface in extension of the lower portions of the recesses to form external shoulders S and S', respectively, whose inner faces provide elongated seats $b$, $b'$, respectively, and whose front ends $b^2$, $b^3$, respectively, are formed diagonally in severing the blank to make the joint. The bases of the tongues are of the same thickness as the ring, as shown at A, A', and their end portions are reduced in thickness by cutting away part of their outer faces to form elongated seats $a$, $a'$, which respectively co-act with the seats $b$, $b'$ of the shoulders to form longitudinally extended seals. The bases of the reduced ends of the tongues are cut diagonally as at $a^2$ and $a^3$ in severing the blank, to correspond with the diagonal ends $b^2$, $b^3$ respectively of the shoulders S, S'. The diagonally abutting opposite pairs of end surfaces $a^2$, $b^2$ and $a^3$, $b^3$ are produced by cutting the blank on spaced diagonal lines which extend symmetrically and preferably equally into the width of the ring on opposite sides or margins of the blank in parallel planes at equal distances from the final transverse dividing line and at obtuse angles to the circumferential or longitudinal line of division of the joint, the inner walls of the recesses being cut along the median line to a common radial plane to sever the ring, the joint thus being formed upon a compound line composed of the pair of spaced parallel diagonal lines $x$, $x'$ and the intermediate circumferential joint-dividing line $x^2$, as shown for example in Fig. 4. The tips of the tongues are beveled as at $a^4$ so that they will not catch on the edges of the shoulders when entering the seats $b$, $b'$, and the bases of these seats are beveled or inclined as at $b^4$ to correspond with the beveled tips of the tongues, the seats $b$, $b'$ being slightly longer than the seats $a$, $a'$ to afford clearance for the tips of the latter but having their bases fitting the tips close enough to prevent an oil pocket at this point to produce carbon by the heat of the engine.

The seats $b$, $b'$ are cut or beveled as at $b^5$ so they are wider at their bases as shown in Fig. 6 to prevent the point of the co-acting tongue being in contact with the side of the seat so that the points will not break by crystallization arising from vibration of the engine.

The co-acting seats on the tongues and shoulders have a longitudinally extended seal whether the ring is closed or expanded.

By my invention the ring is provided with a step-joint having its abutting ends diagonal at obtuse angles to the circumferential or longitudinal line of division of the joint and provided with radially disposed co-acting tongues and shoulders having longitudinally extended contact. Diagonally cut joints of this character have certain advantages, as for example they allow the ends of the ring to overlap or pass to obviate the tendency of the tongues to break off due to the shock when compressing or closing the ring and also to prevent scoring the associated cylinder when the ring expands by heat, but they have the disadvantage that they allow the joint to open when the ring wears or is in an oversized cylinder. Radially cut or step-joints allow the fluid, as the gas in an internal combustion engine, to pass across the inside of the ring at the joint when the ring wears or is in an oversized cylinder, and they do not permit the ends to pass or overlap when closing the ring or when it expands by heat. My invention avoids each of these objections: it affords tightness of the joint due to the extended seal, and allows the ends to overlap or pass due to the diagonal abutment of their meeting surfaces at obtuse angles to the circumferential or longitudinal line of division of the joint; the advantages of the diagonal joint are preserved by the diagonal abutment of its ends, and the opening of the joint is prevented by the co-acting surfaces of the tongues and shoulders. These surfaces are cut on any suitable lines so that they extend longitudinally or in the plane of the ring, and the ends of the tongues preferably are thicker radially than the bases of their coöperating shoulders as clearly shown in Figs. 1 and 5 to afford increased strength to the tongues.

I claim:—

1. A packing-ring having a step-joint formed by two meeting ends, the abutting portions of the joint being diagonal at obtuse angles to the circumferential line of division of the joint and provided with radially disposed co-acting tongues and shoulders on opposite sides of its median line and having longitudinally extended coöperating bearing surfaces forming longitudinally extended seals.

2. A packing-ring having a joint formed by two meeting ends, each end being cut away to form an outer shoulder and an inner tongue on opposite sides of its median line and having longitudinally extended coöperating seats, the abutting portions of the tongues and shoulders being diagonal to the width of the ring at obtuse angles to the circumferential line of division of the joint, and the tips of the tongues being beveled.

3. A packing-ring having a joint formed by two meeting ends, each end being cut away to form an outer shoulder and an inner tongue on opposite sides of its median line, the end of the tongue being of less width than the base of its coöperating shoulder, and the tips of the tongues being beveled.

4. A packing-ring having its joint formed by two meeting ends, each end being cut away to form an outer shoulder and an inner tongue on opposite sides of its median line, the ends of the tongues being of greater radial thickness than the coöperating bases of their shoulders; and the abutting portions of the tongues and shoulders being diagonal to the width of the ring at obtuse angles to the circumferential line of division of the joint.

In testimony whereof I affix my signature in presence of two witnesses.

EDWARD R. NORMAN.

Witnesses:
AMOS B. WHITTLE,
J. McROBERTS.